United States Patent [19]

Uehara et al.

[11] Patent Number: 4,549,237

[45] Date of Patent: Oct. 22, 1985

[54] TAPE MACHINE

[75] Inventors: Seigo Uehara, Fujisawa; Hiroshi Yamanouchi, Tokyo; Mitsugu Kuji, Yokohama, all of Japan

[73] Assignee: Sony Corporation, Tokyo, Japan

[21] Appl. No.: 515,854

[22] Filed: Jul. 21, 1983

[51] Int. Cl.⁴ .................. G11B 27/14; G11B 15/60
[52] U.S. Cl. ................................................. 360/71
[58] Field of Search ................................ 360/71, 90

[56] References Cited

U.S. PATENT DOCUMENTS 4,232,257 11/1980 Harshberger, Jr. .................. 318/314

FOREIGN PATENT DOCUMENTS 1525346 6/1977 United Kingdom .................. 360/71

OTHER PUBLICATIONS

IBM Technical Disclosure Bulletin, vol. 21, No. 7, Dec. 1978, pp. 2692-2693, Storage-Buffered Rotary Actuating Tape Drive, C. A. Milligan et al.

*Primary Examiner*—George G. Stellar
*Attorney, Agent, or Firm*—Lewis H. Eslinger; Alvin Sinderbrand

[57] ABSTRACT

Tape dropouts are reduced, in a digital magnetic tape recorder having a tape length metering roller that provides running length information, by using specially arranged tape guide rollers that cooperate with the metering roller to define a V-shaped tape path to lessen the stresses imposed upon the magnetic tape and to minimize the extent that the tape wraps around the metering roller. The metering roller is arranged at the vertex of the V-shaped tape path with a wrap angle of about ninety degrees and by specifically arranging the guide rollers and the capstan-pinch roller on the tape recorder top plate the tape path length is reduced, thereby accommodating additional apparatus on the top plate.

13 Claims, 2 Drawing Figures

TAPE MACHINE

BACKGROUND OF THE INVENTION

1. Field of the Invention

The present invention relates in general to digital tape recorders employing a timer or metering roller to determine the amount of tape taken off a supply reel and, particularly, to preventing tape dropouts in such tape recorders by providing a specialized tape path.

2. Description of the Prior Art

Tape dropouts, that is, dropouts or interruptions in the signals recorded on, or reproduced from a magnetic tape, present a problem in all magnetic tape recording systems, however, this problem is particularly critical in digital tape recording, for example, as might be accomplished using pulse code modulation (PCM). Such dropouts have a particularly adverse influence on the signals being digitally recorded or reproduced because the wavelengths of the digital signals are much shorter than the wavelengths of the signals present when making analog recordings. Accordingly, a dropout occurring in a digital tape recording will result in missing a larger portion of the recorded information. Thus, the elimination of tape dropouts is much more critical in digital tape recorder design than in analog recorders, and efforts are continuously made in order to eliminate such tape dropouts.

Some known causes of tape dropouts are: irregularities in the thickness of the magnetic layer that is coated onto the tape base; dirt, dust, or other foreign particles that adhere to the surface of the tape; and scratches on the tape surface. Scratches are frequently made on the tape surface by the various rollers, spindles, and tape guides of the tape recorder when foreign matter adheres to their surface, or if there is a surface defect on the roller, either a pit or a raised particle. Not only do the surfaces of the rollers accumulate dust and foreign matter but so does the tape itself along the length of the tape which is exposed over the tape threading path between reels.

Therefore, in order to avoid dropouts in magnetic tape recorders, it is generally desirable to minimize the length of the exposed tape in the path between the reels and also to minimize the areas of contact of the tape with guide rollers and the like.

Another problem associated with the tape used in modern tape recorders is that it is necessary to employ a very thin magnetic layer on the tape base, in order to prevent self-magnetic reduction caused by mutual influence of the signals recorded adjacent each other. Moreover, in general, the base layer of the magnetic recording tape is typically made quite thin in order to provide a longer elapsed playing time at standard speeds, by permitting more tape to be wound on a conventional size reel. The base layer provides most of the mechanical properties of the tape and, thus, a very thin base results in an extremely flexible tape, which is necessary so that the tape can bend along the curves of the guide rollers and heads with good contact. Thus, the stress on the tape should be minimized to avoid damage to the thin tape, and the arrangement of the guide rollers and heads in the tape recorder is known to be a critical factor in determining the stress on the magnetic tape.

While it is understood that the arrangement of the tape guide rollers and heads must be taken into consideration, there are other constraints placed on the system design. For example, digital tape recorders typically employ a tachometer, driven by a roller in contact with the tape, to measure the running length of the tape, and the roller used with the tachometer is usually referred to as a timer roller. Because it is necessary to minimize slippage between the timer roller and the tape, so that there is no error made when measuring the length payed out, the wrap angle of the tape around the timer roller must be greater than around a conventional idler roller. This requirement in relation to the timer roller is at odds with the above-described requirement to reduce dropouts by having a simple loading path with minimal contact between the rollers and the tape and to have a small wrap angle around the several rollers.

OBJECTS AND SUMMARY OF THE INVENTION

Accordingly, it is an object of the present invention to provide a tape recorder having a simple tape loading path with an optimum wrap angle of the tape around a timer roller.

It is another object of the present invention to provide a tape recorder in which mechanical stress on the tape is minimized by the arrangement of the elements in the tape loading path.

It is still another object of the present invention to provide a tape recorder in which the tape can be easily threaded through the tape path.

It is a further object of the present invention to provide a tape recorder having a short tape loading path in relation to known recorders.

It is still a further object of the present invention to provide a tape recorder in which the tape path is arranged to provide additional useful space on the top plate of the tape recorder.

It is another object of the present invention to provide a tape recorder that permits convenient manual tape editing.

In one aspect of the present invention, a digital tape recorder is provided in which the tape loading path is substantially V-shaped, with the timer roller located at the vertex of the V-shaped tape path. In this fashion, the tape loading path is simplified, stresses on the tape are minimized, and the wrap angle of the tape about the timer roller of approximately ninety degrees is sufficient to prevent tape slippage, yet is not so great as to promote tape dropouts by causing tape damage.

By arranging the tape path in this V-shaped fashion, a portion of the top plate of the tape recorder normally taken up by the tape loading path is made available for other uses. Specifically, a tape splice block can be mounted for performing manual tape editing and a control panel can be arranged on the top plate, in the space previously occupied by a portion of the conventional tape path.

The present invention provides a shortened tape loading path, while still permitting the arrangement of all of the necessary heads typically found in a digital tape recorder, in order to minimize the length of the tape that is exposed to the generally hostile ambient environment involving dust and dirt and also to minimize the wrap angle of the tape around the timer roller.

The above and other objects, features, and advantages of the present invention will be apparent from the following detailed description of illustrated embodiments, which is to be read in connection with the accompanying drawings, in which the same reference

DETAILED DESCRIPTION OF PREFERRED EMBODIMENTS

Figure 1:
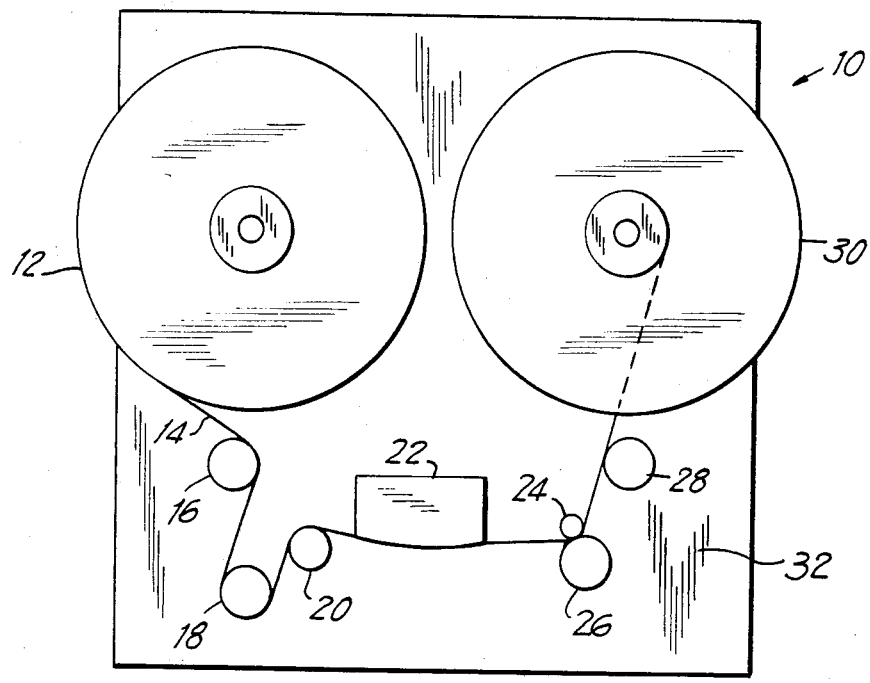
FIG. 1 is a top plan view of a tape recorder showing a tape path known in the prior art.

FIG. 1 is a top plan view of a typical tape recorder 10 having a tape path known in the prior art, and, specifically, in this tape recorder supply reel 12 is provided from which tape 14 is fed, and guide roller 16 initially determines the tape path and leads the tape into contact with timer roller 18, which operates in connection with a tachometer (not shown) to provide tape running-length information. Another guide roller 20 assures that the wrap angle of the tape around timer roller 18 will be sufficient to prevent mutual slippage. The heads of the tape recorder are contained generally within head compartment 22 and need not be shown in order to demonstrate the prior art tape path. A drive capstan 24 also determines the tape path, and a pinch roller 26 maintains contact between the drive capstan 24 and the tape 14 during the record and playback modes. A final idler or guide roller 28 determines the tape path, as the tape is fed onto take-up reel 30. This tape path is relatively long and utilizes substantially all of the top or main plate 32 of the tape recorder. Also, the wrap angle of tape 14 around timer roller 18 must be at least one hundred and eighty degrees in order to preclude slippage. In this prior art tape path, the tape is forced to undergo three, essentially right-angle, direction changes, in addition to the direction reversal caused by the one hundred and eighty degree wrap angle around timer roller 18. Such right-angle direction changes are brought about by rollers 16 and 20 and by capstan 24.

Figure 2:
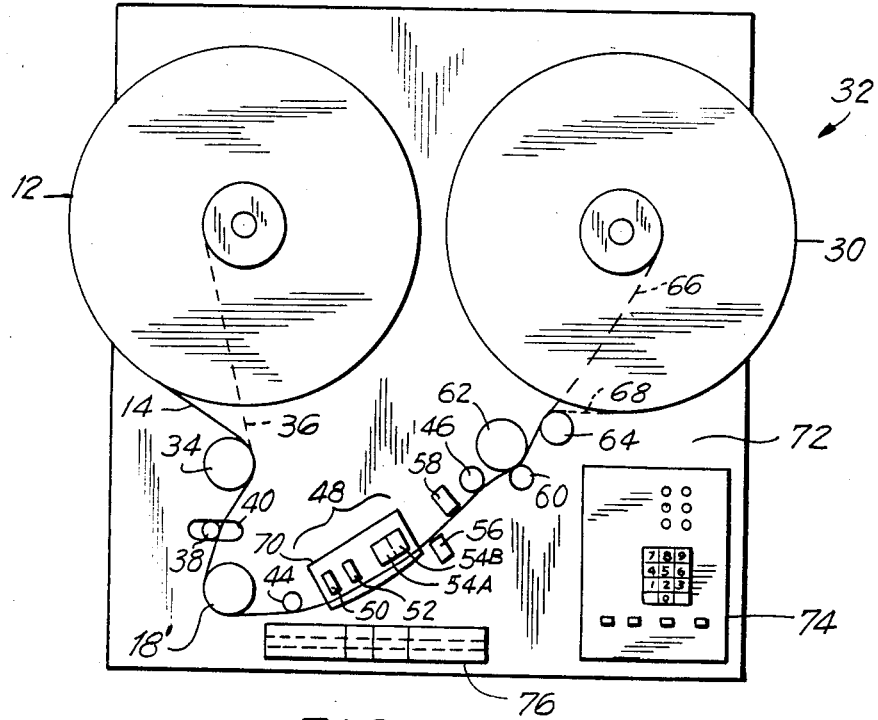
FIG. 2 is a top plan view of a tape recorder employing a V-shaped tape path according to the present invention.

FIG. 2 is a top plan view of a tape recorder having guide rollers specifically arranged to provide a V-shaped tape path and approximately ninety degree wrap angle around a timer roller, according to the present invention. The tape 14 is fed from supply reel 12, and the path of tape 14 is initially defined by guide roller 34, which is positioned to define an initial point on the tape path, regardless of the amount of tape on supply reel 12. This is demonstrated by dashed line 36 showing that, with the tape coming off supply reel 12 when it is substantially empty, the initial point of the tape path defined by roller 34 is the same as when supply reel 12 is full and the tape 14 extends from reel 12 as shown in full lines on FIG. 2. A tension roller 38 contacts tape 14 and is connected to apparatus and circuitry (not shown), which cooperate to control the rotational speed of a motor (also not shown) that is connected to supply reel 12 to maintain appropriate tape tension. The tension roller 38 is arranged for lateral travel within a slot 40, whose length is determined by the range of tensions under which tape 14 may be placed. From tension roller 38, tape 14 progresses around timer or metering roller 18' and then to guide roller 44, which also defines the tape path. As shown on FIG. 2, the relationship between tape 14 and timer roller 18' in the tape recorder according to the invention is such that the wrap angle of the tape around the timer roller is only approximately ninety degrees, whereas, in the prior art recorder of FIG. 1, the wrap angle of tape 14 around timer roller 18 was approximately one hundred and eighty degrees, which is twice that of the present invention. This ninety degree wrap angle of tape 14 around the timer or metering roller 18' has proven successfully to prevent tape slippage and to provide accurate measurement of the tape length that has been fed out.

Guide roller 46 is a mate to guide roller 44 and further serves to define the tape path through the head block, shown generally at 48. The location of idler rollers 44 and 46 must precisely define the tape path, so that proper contact is made between the tape 14 and the heads of head block 48. Head block 48 includes digital recording head 50, digital playback head 52, and analog erase head 54A and analog recording and playback head 54B, which are integrally formed as a single unit. A sensor 56 is provided adjacent head block 48, and a synchronized recording head 58 is also arranged to be in operable contact with tape 14. Sensor 56 is an end-of-tape sensor and terminates the operation of the tape recorder upon sensing the end of the tape. Synchronized recording head 46 is used for recording an audio signal on one channel in synchronization with an audio signal on another channel that is being reproduced by the digital playback head 52. One example of a use for synchronized recording head 58 is to permit a vocal audio track to be recorded on one channel in synchronization with the sounds of a musical instrument, such as a piano, which had been previously recorded on the other channel. Tape drive in the play and record modes is accomplished in the conventional fashion by means of driven capstan 60 and pinch roller 62, which can be moved into and out of engagement to assure proper contact between tape 14 and the driven capstan 60. It is specifically pointed out that capstan 60 does not define an acute directional change in the tape path. Guide roller 64 corresponds to guide roller 34 and is located so that the tape loading path is maintained substantially constant in relation to timer roller 18 and head block 48, regardless of the amount of tape on take-up reel 30. This is shown by dashed line 66 representing a tape path when take-up spool 30 is substantially empty and dashed line 68 representing a tape path when reel 30 is substantially full. It is conventional practice to provide a shield 70 to protect heads 50, 52, and 54A and 54B that make up head block 48.

As may be seen by comparing the tape recorder of FIG. 1, employing a conventional tape path, with FIG. 2, showing the specialized guide roller arrangement providing the V-shaped tape path according to the present invention, a substantial portion of the top surface of the main plate 72 of the tape recorder is no longer occupied by the tape loading path. Thus, this available area can be otherwise gainfully utilized. In that regard, shown generally at 74 is a control panel that can include the controls, indicator lights, tape drive switches and the like that are known for use in the typical digital tape recorder. Additionally, a tape editing or splicing block 76 is also mounted on the main plate 72 of the tape recorder and, by use of this splicing block 76, manual editing of the tape 14 is facilitated.

In the embodiment of the present invention shown in FIG. 2, the vertex of the V-shaped tape path is at the lower left-hand corner of the top or main plate 72 of the tape recorder, and is defined by the location of timer roller 18' which is arranged before or upstream from the head block 48, in relation to the direction of tape travel during the play and record modes. This arrangement is specifically provided by the present invention so that the tape may be severed or spliced by using the tape editing block 76 after the length has been metered. By this arrangement, if it is desired to cut or edit the tape without using take-up spool 30, the amount of tape that has been run off can be determined because timer roller 18′ is located before the capstan and pinch roller arrangement 60, 62, respectively. Thus, the location of the timer roller 18′ is specifically chosen based upon the location of the pinch roller 62 and capstan 60.

Additionally, according to the present invention the tape path is specifically shortened in relation to known tape path configurations, in order to minimize the occasion for dust and foreign particles to be attracted to the tape 14 and also to impart only a minimal amount stress to the tape, as seen for example by the relatively small wrap angle around timer roller 18 and by the elimination of the high tape stress point in the tape path caused by the capstan and pinch roller 24, 26 of FIG. 1. The tape path according to the present invention also eliminates almost all of the numerous right-angle bends in the tape, as well as eliminating the direction reversal caused by the one hundred and eighty degree wrap angle around the timer roller. Also, by providing this shortened, V-shaped tape path, as shown in FIG. 2, more area is made available on the top plate 72 of the tape recorder for a control panel 74 and for an editing block 76.

Although a preferred embodiment of the present invention has been described above with reference to the accompanying drawing, it will be apparent that the invention is not limited to that precise embodiment and that many modifications and variations can be effected therein by one skilled in the art without departing from the spirit and scope of the invention, as defined by the appended claims.

What is claimed is:

1. Apparatus for use with a tape recorder of the kind having a tape supply reel and a tape take-up reel mounted on a top plate and a tape drive for transporting tape therebetween, comprising;
   tape measuring means having a metering roller in contact with said tape for providing an indication of the length of tape that is transported; and
   tape guide means contacting said tape and arranged on said top plate for causing said tape to contact said metering roller over a subtended angle of approximately ninety degrees.

2. Apparatus for use with a tape recorder according to claim 1, in which said tape guide means includes means arranged on said top plate to cause said tape to follow a substantially V-shaped tape path having arms and a vertex defined therebetween, and said metering roller is arranged on said top plate at said vertex of said V-shaped tape path.

3. Apparatus for use with a tape recorder according to claim 2, in which head means for recording or playback of signals on said tape are arranged on said top plate along one of said arms of said substantially V-shaped tape path.

4. Apparatus for use with a tape recorder according to claim 1, in which said tape guide means includes at least first and second idler rollers arranged on said top plate on either side of said metering roller.

5. Apparatus for use with a tape recorder according to claim 1, in which said tape guide means includes tape tension control means in contact with said tape and arranged between said supply reel and said metering roller for controlling the tension of said tape.

6. Apparatus for use with a tape recorder having a pair of tape reels in spaced-apart relationship and being driven for transporting tape therebetween, comprising;
   metering roller means in contact with said tape for indicating the amount of tape transported;
   tape guide means for guiding said tape along a tape path, whereby said tape is in contact with said metering roller means with a wrap angle therearound of approximately ninety degrees and said tape path is substantially V-shaped so as to have arms defining a vertex therebetween at said metering roller means; and
   head means for recording or playing back signals on said tape arranged along an arm of said substantially V-shaped tape path.

7. Apparatus for use with a tape recorder according to claim 6, in which said tape guide means includes a tape tension roller in contact with said tape for controlling the tension thereof and being arranged adjacent said metering roller means.

8. Apparatus for use with a tape recorder according to claim 6, in which said tape guide means includes at least first, second and third idler rollers in contact with said tape, said first idler roller being located between one of said tape reels and said metering roller means and said second and third idler rollers being located at opposite sides, respectively, of said head means in relation to said tape path.

9. Apparatus for defining a tape path in combination with a tape recorder having a supply reel and a take-up reel operably driven to transport tape therebetween, a head to record or playback signals on said tape, and a tape length metering roller for measuring the length of tape transported, comprising tape guide means in contact with said tape and arranged before and after said tape length metering roller for defining a tape path between said supply and take-up reels in which said tape contacts said tape length metering roller with a wrap angle of approximately ninety degrees.

10. Apparatus for defining a tape path according to claim 9, in which said tape guide means includes idler rollers arranged to contact said tape for configuring said tape path to be substantially V-shaped and have arms with a vertex therebetween at which said tape length metering roller is arranged.

11. Apparatus for defining a tape path according to claim 10, further comprising means for mounting said head in alignment with one of said arms of said substantially V-shaped tape path.

12. Apparatus for defining a tape path according to claim 9, in which tape tension roller means is arranged in contact with said tape for controlling tape tension during transport thereof.

13. Apparatus for defining a tape path according to claim 9, in which said tape guide means includes means for maintaining said tape path in a substantially constant configuration independently of the amounts of tape on said supply and the take-up reels.

* * * * *